Feb. 22, 1938.  W. J. JACOBSSON  2,109,251
FLUID MIXER
Filed Aug. 8, 1934
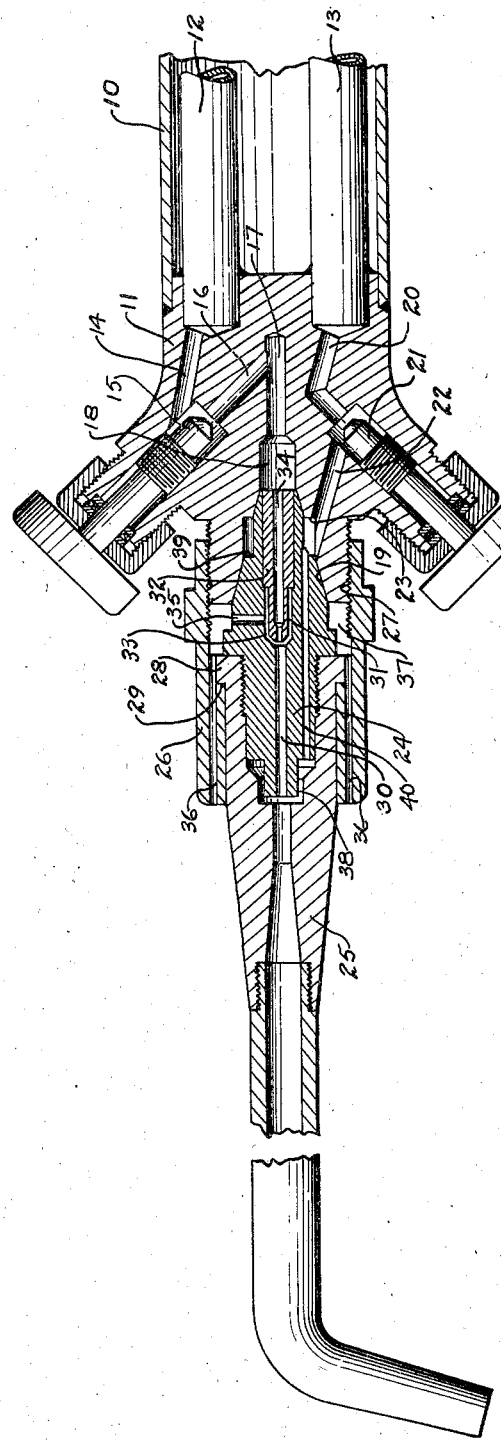
INVENTOR
WILGOT J. JACOBSSON
BY
ATTORNEY Patented Feb. 22, 1938

2,109,251

UNITED STATES PATENT OFFICE 2,109,251

FLUID MIXER

Wilgot J. Jacobsson, Elizabeth, N. J., assignor, by mesne assignments, to Union Carbide and Carbon Corporation, a corporation of New York Application August 8, 1934, Serial No. 738,924

12 Claims. (Cl. 158—27.4)

This invention relates to a fluid mixer and more particularly to an improved gas mixer for blowpipes. The invention relates especially to a unitary mixer for blowpipes which first mixes air with either fuel-gas or oxygen and thereafter mixes the oxygen or fuel-gas with the first mixture.

In welding and high temperature heating operations it is frequently desirable to reduce the volume of gas consumed, and accordingly air may be mixed with the combustible gas mixture before it reaches the flame. Furthermore, in different classes of service different ratios of combustion gas, combustion-supporting gas and air are required to give the greatest efficiency in operation and gas economy. One object of this invention is to provide a gas mixer in unitary form which will properly mix the desired proportions of combustion gas, combustion-supporting gas and air for a given type of service. Another object is the provision of such a mixer in a form which will permit it to be readily removed from the blowpipe as a unit. A further object is the provision of a set of unitary mixers having different dimensions in order that any mixer may be quickly replaced by another mixer of the set to meet a change in service requirements of the blowpipe. Other objects will become apparent upon consideration of the present specification.

The invention is shown by way of illustration in the accompanying drawing which represents a broken longitudinal mid-section through a blowpipe constructed in accordance with the invention.

In the embodiment of the invention illustrated in the drawing there is shown a blowpipe handle 10 having a forward end 11 in which are soldered or otherwise attached the end of an oxygen conduit 12 and the end of a fuel-gas conduit 13. A duct 14 formed in the forward end 11 of the handle connects the oxygen conduit 12 with an oxygen regulating valve 15 from which ducts 16 and 17, in series, lead to a chamber 18 at the base of a concave conical opening 19 in the forward end of the handle. A duct 20 connects the fuel-gas conduit 13 with a fuel-gas control valve 21, whence a duct 22 leads to an annular groove 23 in the concave conical opening 19.

A unitary mixing nozzle 24 is secured in operative position between the handle 10 and a stem 25 by means of a coupling 26, which may be screwed upon external threads 27 on the forward end of the handle 11, engaging an annular projection 28 on the stem 25 by means of an internal shoulder 29 on the coupling 26. The unitary mixer or mixing nozzle 24 comprises a nozzle body having an axial bore 30 therethrough with an enlarged cavity 31 at the rear end of the bore. An injector 32 is fitted in the cavity 31 and has its forward part spaced from the wall of the cavity and from the rear end of the bore 30 to provide a chamber 33 communicating with the bore 30. The injector 32 has an axial bore 34 through it which extends, when the mixer is in position, from the chamber 18 in the handle end 11 to the chamber 33 in the mixer, being disposed in a position to project fluid passing through it into the axial bore 30 of the mixer.

An air port 35 extends through the nozzle body to the cavity 31 therein terminating in the chamber 33. Thus, a fluid under pressure passing through the injector will aspirate air through the air port into the chamber 33 and thence into the axial bore 30 of the mixing nozzle. Air passages 36 in the coupling 26 give access to atmospheric air into a space 37 between the coupling 26 and the mixing nozzle 24.

The forward end of the mixing nozzle has a reduced section and clears the inner walls of the stem so as to form a chamber 38 about this forward end. An annular groove 39 in the rear end of the mixing nozzle registers with the annular groove 23 in the forward end 11 of the handle 10 to form an annular chamber at the rear end of the mixing nozzle. One or more longitudinal passages 40, substantially parallel to the bore 30, connect the annular chamber formed by the grooves 39 and 23 with the chamber 38 in the forward part of the mixing nozzle.

From the foregoing the operation of the apparatus will be clear. Oxygen coming to the blowpipe through the oxygen conduit 12 passes through the duct 14 to the oxygen regulating valve 15. When the valve 15 is open the oxygen passes through the ducts 16 and 17 into the chamber 18 whence it passes through the axial bore 34 in the injector 32 and through the chamber 33, aspirating air and mixing with it in passing through the axial bore 30 of the mixer. Projected through the end of the bore 30 and the chamber 38 the oxygen-air mixture aspirates fuel-gas from the chamber 38 into the stem where the oxygen, fuel-gas and air are thoroughly mixed before being projected through the usual tip at the end of the stem.

At the same time fuel-gas, as acetylene, reaching the blowpipe through the fuel-gas conduit 13, passes through the duct 20 to the fuel-gas regulating valve 21. When this valve is open the fuel-gas passes through the duct 22 into the chamber formed between the annular groove 23 and the annular groove 39. Thence the fuel-gas passes through the longitudinal passage 40 to the chamber 38, and from there is aspirated into the stem as already described. Obviously the oxygen and fuel-gas may be transposed, the fuel-gas passing through the injector 32 and thereby aspirating and mixing with air before it in turn aspirates the oxygen from the chamber 38.

For different types of service different proportions of the gases will be required. In order to meet this situation a set of unitary mixers having different dimensions may be provided, the injector and mixer ends being larger or smaller to decrease or increase the size of the chamber 33 or the chamber 38, and the diameters of the bores and passages being increased or decreased as desired. The dimensions of the mixer where it contacts with the handle or the stem will, of course, be equal in all cases, in order that one mixer may be substituted for another.

It will be appreciated, of course, that the example here given and illustrated in the drawing is presented to indicate how the invention may be applied and is not to be taken as limiting its scope.

I claim:

1. A unitary mixing nozzle comprising a nozzle body having an axial bore therethrough with an enlarged cavity at the rear end of the bore, and an injector nozzle fitted in the cavity in said nozzle body, said injector nozzle having a part thereof spaced from the wall of the cavity and from the rear end of the bore to provide a chamber communicating with the bore, said mixing nozzle having therein a port communicating with the chamber, the axial bore through said mixing nozzle and the passage through said injector nozzle providing means for passage of a gas through said mixing nozzle, said nozzle body having therein a longitudinal passage substantially parallel to the bore, the longitudinal passage in said nozzle body providing means for passage of a second gas through said mixing nozzle to the forward end thereof for mixing with the first gas.

2. A unitary mixing nozzle comprising a nozzle body having an axial bore therethrough with an enlarged cavity at the rear end of the bore, and an injector nozzle fitted in the cavity in said nozzle body, said injector nozzle having a part thereof spaced from the wall of the cavity and from the rear end of the bore to provide a chamber communicating with the bore, said mixing nozzle having therein a port communicating with the chamber the axial bore through said mixing nozzle and the passage through said injector nozzle providing means for passage of a gas through said mixing nozzle, said nozzle body having therein an annular recess adjacent its rear end and connecting with the annular recess a longitudinal passage substantially parallel to the bore, the longitudinal passage in said nozzle body providing means for passage of a second gas through said mixing nozzle to the forward end thereof for mixing with the first gas.

3. A unitary mixing nozzle comprising a nozzle body having an axial bore therethrough with an enlarged cavity at the rear end of the bore, and an injector nozzle fitted in the cavity in said nozzle body, said injector nozzle having a part thereof spaced from the wall of the cavity and from the rear end of the bore to provide a chamber communicating with the bore, the axial bore through said mixing nozzle and the passage through said injector nozzle providing means for passage of a gas through said mixing nozzle, said nozzle body having therein an annular recess adjacent its rear end and connecting with the annular recess a longitudinal passage substantially parallel to the bore, said nozzle body also having therein a port extending from its surface in the rear thereof to the chamber formed in the cavity, the longitudinal passage in said nozzle body providing means for passage of a second gas through said mixing nozzle to the forward end thereof for mixing with the first gas.

4. A unitary mixing nozzle comprising a nozzle body having an axial bore therethrough with an enlarged cavity at the rear end of the bore, a threaded section intermediate the ends of said nozzle, an annular projection adjacent the threaded section, said projection serving to contact an external face of an internally threaded body into which said mixing nozzle is screwed to limit the distance which said mixing nozzle extends into said body, and an injector nozzle fitted in the cavity in said nozzle body, said injector nozzle having a part thereof spaced from the wall of the cavity and from the rear end of the bore to provide a chamber communicating with the bore, the axial bore through said mixing nozzle and the passage through said injector nozzle providing means for passage of a gas through said mixing nozzle, said nozzle body having therein a longitudinal passage substantially parallel to the bore, the longitudinal passage in said nozzle body providing means for passage of a second gas through said mixing nozzle to the forward end thereof for mixing with the first gas.

5. A unitary mixing nozzle comprising a nozzle body having an axial bore therethrough with an enlarged cavity at the rear end of the bore, a threaded section intermediate the ends of said nozzle, an annular projection adjacent the threaded section, said projection serving to contact an external face of an internally threaded body into which said mixing nozzle is screwed to limit the distance which said mixing nozzle extends into said body, and an injector nozzle fitted in the cavity in said nozzle body, said injector nozzle having a part thereof spaced from the wall of the cavity and from the rear end of the bore to provide a chamber communicating with the bore, the axial bore through said mixing nozzle and the passage through said injector nozzle providing means for passage of a gas through said mixing nozzle, said nozzle body having therein an annular recess adjacent its rear end and connecting with the annular recess a longitudinal passage substantially parallel to the bore, the longitudinal passage in said nozzle body providing means for passage of a second gas through said mixing nozzle to the forward end thereof for mixing with the first gas, said nozzle body also having therein a port extending from its surface in the rear thereof to the cavity.

6. A unitary mixing nozzle comprising a nozzle body having an axial bore therethrough with an enlarged cavity at the rear end of the bore, and an injector nozzle fitted in the cavity in said nozzle body, said injector nozzle having a part thereof spaced from the wall of the cavity and from the rear end of the bore to provide a chamber communicating with the bore, said mixing nozzle having therein a port communicating with the chamber, the axial bore through said mixing nozzle and the passage through said injector nozzle providing means for passage of a gas through said mixing nozzle, said nozzle body having therein a longitudinal passage substantially parallel to the bore, the longitudinal passage in said nozzle body being substantially shorter than the combined length of the axial passage and the bore, and providing means for passage of a second gas through said mixing nozzle to the forward end thereof for mixing with the first gas.

7. A unitary mixing nozzle comprising a nozzle body having an axial bore therethrough, an enlarged cavity at the rear end of said bore, and an air port extending through the nozzle body to the cavity; and an injector nozzle fitted in the cavity in said nozzle body, said injector nozzle having a part thereof spaced from the wall of the cavity and from the rear end of the bore to provide a chamber communicating with the bore and said air port, the axial bore through said mixing nozzle and the passage through said injector nozzle providing means for passage of a gas through said mixing nozzle, said nozzle body having therein a longitudinal passage substantially parallel to the bore providing means for passage of a second gas through said mixing nozzle to the forward end thereof for mixing with the first gas.

8. In a blowpipe, a handle having oxygen and fuel-gas passages therein; a stem having a gas passage therethrough; a unitary mixer; and means for securing said mixer between said handle and said stem; said mixer having an axial passage therethrough with a cavity at its rear end, an injector nozzle in the cavity in communication with one of the passages in said handle, the axial passage through said mixer and the passage through said injector nozzle providing means for passage of a gas through said mixer, an air duct extending through said mixer and communicating with the cavity formed therein, and a second passage in communication with the other passage in said handle, said second passage in said mixer providing means for passage of a second gas through said mixer to the forward end thereof for mixing with the first gas.

9. In a blowpipe, a handle having a recess with conical walls at the forward end thereof, a stem, a unitary mixing nozzle fastened in said stem, said nozzle having a convex conical rear end adapted to mate with the recess at the forward handle end, and means for holding said handle and said stem together with the rear end of said nozzle held firmly in the recess in said handle, said nozzle having an axial bore therethrough, a cavity in its rear end in continuation of said bore, and an injector nozzle fitted in the cavity in said mixing nozzle.

10. In a blowpipe, a handle having a bore therein and a recess with conical walls at the forward end thereof; and a mixing nozzle having a convex conical rear end adapted to mate with the recess at the forward handle end; said mixing nozzle comprising a nozzle body having an axial bore therethrough and an enlarged cavity at the rear end of said body in communication with the bore therein, and an injector nozzle fitted in the cavity in said nozzle body, the axial bore through said mixing nozzle and a bore through said injector nozzle providing means for passage of a gas through said mixing nozzle, said injector nozzle having a part thereof spaced from the wall of the cavity and from the rear end of the bore to provide a chamber communicating with the bore, said mixing nozzle having therein a port communicating with the chamber, the bore in said injector nozzle communicating with the bore in said handle and with the chamber; said mixing nozzle body having therein a longitudinal passage substantially parallel to the bore, the longitudinal passage in said mixing nozzle body providing means for passage of a second gas through said mixing nozzle to the forward end thereof for mixing with said first gas.

11. In a blowpipe a handle having a bore therein, a recess with conical walls at the forward end thereof and another bore terminating in the recess; and a mixing nozzle having a convex conical rear end adapted to mate with the recess at the forward handle end; said mixing nozzle comprising a nozzle body having an axial bore therethrough and an enlarged cavity at the rear end of said body in communication with the bore therein, and an injector nozzle fitted in the cavity in said nozzle body, said injector nozzle having a part thereof spaced from the wall of the cavity and from the rear end of the bore to provide a chamber communicating with the bore, said injector nozzle also having a bore therethrough communicating with the bore in said handle and with the chamber; the axial bore through said mixing nozzle and the bore through said injector nozzle providing means for passage of a gas through said mixing nozzle, said nozzle body having therein a port for admitting atmospheric air to the chamber, and said nozzle body also having therein an annular recess adjacent the opening of the second bore in said handle and communicating with the annular recess a longitudinal passage for a second gas substantially parallel to the bore in said nozzle body, the longitudinal passage in said nozzle body being adapted to deliver the second gas adjacent the forward end of the axial bore in said nozzle body for mixture with the first gas.

12. In a blowpipe for projecting different mixtures of fuel gas and oxygen, a handle having fuel gas and oxygen passages therein; a stem having a gas passage therethrough; a removable unitary mixer for mixing the desired mixture of fuel gas and oxygen; and means for securing said mixer between said handle and said stem; said mixer having a passage therethrough with a cavity at its rear end, an injector nozzle in the cavity in communication with one of the passages in said handle, the passage through said mixer and the passage through said injector nozzle providing means for passage of a gas through said mixer, an air duct extending through said mixer into the cavity formed therein, and a second passage extending through said mixer substantially parallel to the first passage therethrough, the second passage being in communication with the other passage in said handle and providing for passage of a second gas through said mixer to the forward end thereof for mixing with the first gas.

WILGOT J. JACOBSSON.

CERTIFICATE OF CORRECTION.

Patent No. 2,109,251. February 22, 1938.

WILGOT J. JACOBSSON.

It is hereby certified that error appears in the printed specification of the above numbered patent requiring correction as follows: Page 2, first column, line 57, claim 2, after the word "chamber" insert a comma; and second column, lines 10 to 14 inclusive, claim 3, strike out the comma and words ", the longitudinal passage in said nozzle body providing means for passage of a second gas through said mixing nozzle to the forward end thereof for mixing with the first gas" and insert the same after "bore" and before the comma in line 7, same claim; and that the said Letters Patent should be read with these corrections therein that the same may conform to the record of the case in the Patent Office.

Signed and sealed this 5th day of April, A. D. 1938.

Henry Van Arsdale,
Acting Commissioner of Patents.

(Seal)